United States Patent Office 3,174,657
Patented Mar. 23, 1965

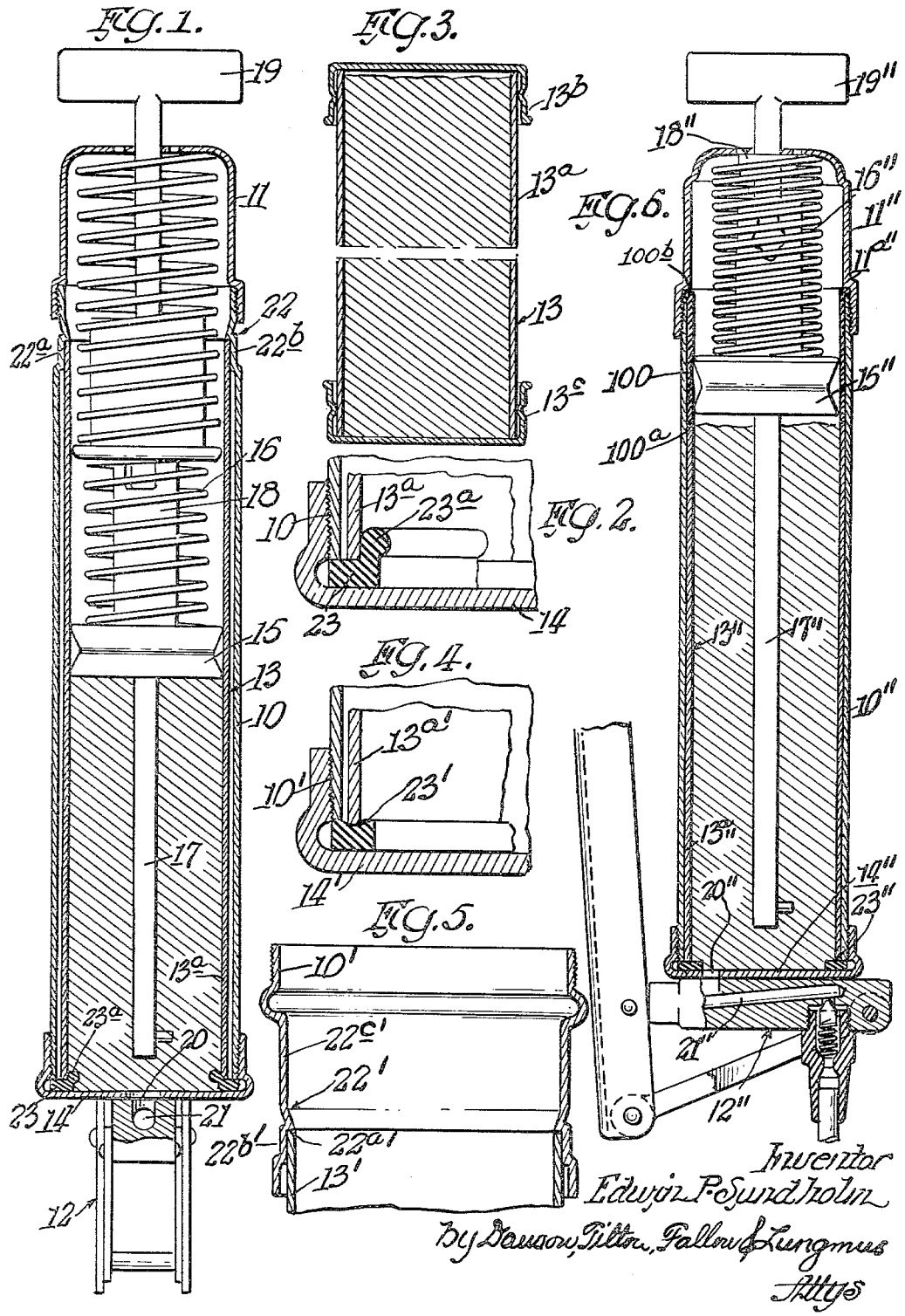

3,174,657
GREASE GUN AND CARTRIDGE COMBINATION
Edwin P. Sundholm, Albert City, Iowa
Filed May 17, 1961, Ser. No. 110,807
6 Claims. (Cl. 222—326)

This invention relates to a grease gun and cartridge combination. The invention is particularly adapted for use with the hand or lever-operated grease guns which are widely used at the present time.

This application is a continuation-in-part of my copending application Serial No. 816,897, now abandoned, filed May 29, 1959.

The use of grease in cylindrical cartridges which can be inserted in the barrel of a grease gun has been subject to the disadvantage that it is considerably more expensive than bulk greases. It is therefore an object of this invention to provide an improved grease gun and cartridge combination which among other advantages permits a substantial reduction in the cost of using cartridge-packaged greases.

In the use of cartridge-packaged greases, it is important to achieve a tight seal between the front end of the cartridge containing the grease and the dispensing head of the grease gun. Heretofore this has been accomplished by affixing a crimped metal cap to the forward end of the grease cartridge, the walls of which are usually formed of paperboard. This crimped cap provides an annular outwardly extending rim which can be clamped to the sealing gasket between the forward end edge of the grease barrel and the transverse portion of the attachment cap which forms part of the dispensing head. A metal end including a fixed rim portion has also been generally employed on the rear end of the grease cartridges. These metal end portions have increased the cost of packaging grease in disposable cartridges.

A grease cartridge having slip-on covers on both ends would be considerably less expensive than the grease cartridges available prior to the present invention, but such cartridges would not be practical with the grease guns in use prior to applicant's invention. There would be no assurance of an effective seal between the forward end of the grease cartridge and the dispensing head. It is therefore a more specific object of this invention to provide a grease gun which is especially adapted for use with grease cartridges having removable slip-on covers on both ends, so that the cylindrical wall of the cartridge is formed entirely of paperboard or other non-metallic material. Further objects and advantages will become apparent as the specification proceeds.

The present invention is illustrated in the accompanying drawing, in which:

FIG. 1 is a side sectional view of a grease gun embodying the feature of the present invention;

FIG. 2, an enlarged sectional detailed view showing the head gasket and the relation of this gasket to the forward end of the grease cartridge;

FIG. 3, a side sectional view of a grease cartridge of the type which can be used in the combination of the present invention;

FIG. 4, a view similar to FIG. 2 illustrating a modified form of the gasket which can be used in the combination of this invention;

FIG. 5, an enlarged fragmentary sectional view illustrating the stop means provided by the grease gun barrel for engaging the rear end of the grease cartridge; and FIG. 6, a side elevational view of a grease gun similar to the grease gun of FIG. 1 illustrating the use of the gasket of FIG. 4 and showing a modification of the stop means of FIG. 5.

Speaking generally, the grease gun of FIG. 1 includes a cylindrical grease container or barrel 10, a closure cap 11 threadedly connected to the rear of the barrel, and a grease gun dispensing head 12 removably mounted on the front end of the barrel. It will be noted that the cylindrical barrel 10 is elongated for receiving a grease cartridge, such as the cartridge 13 shown in FIG. 1. It will also be noted that the grease dispensing head 12 provides a cup-shaped cap 14 which is received over the forward end portion of barrel 10. The forward end portion of barrel 10 is externally threaded, and the cylindrical wall of cap 14 is internally threaded to provide an adjustable threaded connection between these parts.

Within barrel 10 is a slidable plunger assembly 15. In the illustration given, a compound telescoping spring 16 is provided behind plunger assembly 15. The grease gun also includes the usual plunger rod 17 which is adapted for releasable engagement with the plunger assembly for retracting, advancing, or rotating the assembly. A locking sleeve 18 is mounted on the rear of assembly 15, the rear end of the sleeve providing elements releasably engageable with the rear wall of cap 11 when the plunger assembly 15 is in the withdrawn position prior to insertion within the open rear end of a grease cartridge. A handle 19 is secured to the rear end of rod 17.

In the operation of the grease gun, grease is discharged through a port 20 in dispensing head cap 14, being sucked from within barrel 10 by means of a lever actuated pump which forms part of the dispensing head, as is well-known in the art. The chamber of the piston actuated pump is indicated at 21 in FIG. 1. Since the present invention is independent of any particular pump arrangement, plunger assembly, or spring and operating rod, it is not believed that it will be necessary to further describe these elements.

A grease cartridge of the type usable with the gun of FIG. 1 is shown in FIG. 3. This includes a cylindrical body portion 13a, and slip-on end caps 13b and 13c. The caps slip-on over the outside of the ends of the cartridge body, and are held thereon by frictional engagement. Hence, they are readily removable to provide an open ended cartridge for insertion into the grease gun. The body 13a is formed of a non-plastic material. For example, it may be formed of a lightweight cardboard, such as paperboard. The container body 13a may also be formed of a suitable plastic material, such as polyvinyl butyrate, polyethylene, polyvinyl chloride, etc. If desired, the end cap 13b and 13c may also be formed of a suitable non-metallic material, such as plastic. With the combination of the present invention, there is no need to provide the cylindrical body 13a with crimped on metal end caps.

In accordance with the present invention, a stop means is disposed within the rearward portion of barrel 10. This stop means should be constructed and arranged for restraining further rearward movement of the grease cartridge after it has been fully inserted within the barrel.

In the embodiment of FIG. 1 the stop means is provided by and integrally formed with the wall of the barrel. In the illustration given, barrel 10 toward the rear thereof provides an inwardly formed section 22, which includes an annular shoulder or abutment 22a for engaging the rear edge of the grease cartridge 13. The inwardly formed portion 22 also provides a cylindrical section 22b concentric with barrel 10 which snugly receives the upper end of the grease cartridge, as indicated in FIG. 1, and thereby holds the grease cartridge in centered relation within the barrel with the wall of the cartridge spaced from the wall of the barrel.

The combination of this invention also includes an annular gasket 23 which is interposed between the front end edge of barrel 10 and the inside of the transversely extending portion of cap 14. Gasket 23 should be formed of a resilient, flexible material such as synthetic rubber, which is somewhat compressible. Gasket 23 would be dimensioned so that it provides an annular portion extending inwardly beyond the wall of barrel 10.

The desired relationship of the parts during the dispensing of grease is illustrated in FIG. 1. The forward end of the grease cartridge wall 13a is in direct contact with the inwardly extending portion of gasket 23. The rear end of wall 13a should be dimensioned so that it extends at least for the full distance from abutment 22a to the plane of the forward end of barrel 10. With this construction, when cap 14 is screwed onto the forward end of barrel 10, the gasket 23 will be compressed and the inwardly extending portion of the gasket will be forced into engagement with the forward end of wall 13a. If desired, the inner portion of gasket 23 can be provided with a rearwardly extending projection 23a, the projection being annular and adapted to bear against the inside of wall 13a, as shown in FIG. 1 and more clearly in FIG. 2.

In FIG. 4 there is illustrated a modified gasket 23'. This gasket omits the portion 23a. In FIG. 4, since the other parts correspond to those previously described they have been given the same numbers except the numbers have been primed. Where the lengths of the grease cartridges can be controlled within close limits, and where they are formed of a material sufficiently rigid to permit the cartridge to be clamped between the abutment at the rear of the barrel and the gasket at the forward end, the form of the gasket shown in FIG. 4 is quite satisfactory. Gasket 23' is compressible, while the stop means which bears against the other end of the cartridge is non-compressible and fixed in position. This permits a sealing engagement to be obtained between the forward end of the cartridge 13a' and the gasket 23' by tightening the cap 14' onto the barrel 10'. As shown in FIG. 4, it is preferred to have the cartridge 13a' extend slightly beyond the end of barrel 10'. For example, cartridge 13a' may project from .015 to .020 inch beyond barrel 10'.

FIG. 5 illustrates a modification of the rear portion of the grease gun barrel. As shown in that figure, the barrel 10' includes the inwardly formed portion 22', which provides the annular abutment 22a' and the annular centering section 22b'. In addition, there is provided an elongated cylindrical portion 22c', which is adapted to cooperate with the plunger assembly to increase the sealing engagement between the plunger and the grease gun barrel when it is withdrawn into the rearward portion of the barrel. Since this feature is not directly related to the present invention, it is not believed it will be necessary to describe it further herein.

As indicated, the embodiment of FIG. 1 also includes the centering section 22b, which functions in the manner previously described. While the construction of FIG. 5 can be used with either the gasket of FIG. 2 or the gasket of FIG. 4, the gasket of FIG. 2, which includes the annular portion 23a, provides an added advantage in that it tends to hold the forward end of the grease gun cartridge in centered relation within the barrel.

FIG. 6 illustrates a modification of the stop means. In this embodiment, the barrel 10" is not provided with an inwardly formed portion. Instead, a sleeve 100 is inserted within the rearward portion of the barrel. In the illustration given, the forward end 100a acts as the abutment which bears against the rear end of cartridge wall 13a". The rear end of sleeve 100 is provided with an outwardly turned portion 100b, which is adapted to be clamped between the shoulder 11a" of rear cap 11" and the rear end of barrel 10", as shown in FIG. 6. It will be noted that the embodiment of FIG. 6 includes a gasket 23" similar to the gasket of FIG. 4. Since most of the other elements correspond with those of FIG. 1, the same numbers have been applied except that the numbers have been double primed to indicate that they are being used for a modified construction. The spring 16" is a single coil spring of the compression type. It will be noted that the plunger assembly 15" can be withdrawn within the sleeve 100 for insertion into the open rear end of grease cartridge 13".

Similarly, in the embodiment of FIG. 1, the plunger assembly 15 is withdrawn to a position behind abutment 22a for insertion into the end of the grease cartridge. The dispensing head 12 or 12" is removed, and the grease cartridge is inserted while the plunger assembly is in the withdrawn position. The dispensing head is then screwed back on the front end of the barrel and tightened until the gasket is clamped tightly against the front end of the grease cartridge.

While in the foregoing specification, the present invention has been described in relation to certain embodiments thereof, it will be understood that the invention is susceptible to other embodiments and that many of the details described herein can be varied considerably without departing from the basic principles of the invention.

I claim:

1. In a grease gun having an elongated cylindrical barrel externally threaded on the forward end portion thereof, and a lever-operated grease dispensing head providing an internally threaded cup-shaped cap threadedly received on said barrel forward end portion, the combination comprising an annular gasket of resilient, compressible material interposed between the front end of said barrel and said cap and extending inwardly beyond the wall of said barrel for a distance at least as great as the thickness of said barrel wall and completely therearound, a cylindrical grease-containing cartridge disposed within said barrel, the cylindrical wall of said cartridge being formed of a non-metallic material and terminating in forward and rear ends providing surfaces lying in planes substantially at right angles to the axis of said cartridge, said cartridge wall forward end being in direct contact with the inwardly extending portion of said gasket, said gasket having a rearwardly extending projection bearing against the inside of said cartridge wall, stop means disposed within the rearward portion of said barrel, said stop means providing an annular abutment in direct contact with the said rear end of said cartridge wall for restraining further rearward movement of said cartridge as said gasket is forced into engagement with the forward end of said cartridge by tightening said cap on said barrel, the cooperating threaded portions of said cap and barrel permitting said cap to be tightened on said barrel until said cartridge wall forward end sealingly engages the said inwardly extending portion of said gasket.

2. The combination of claim 1 in which said stop means is provided by and integrally formed with the wall of said barrel, said abutment comprising an annular inwardly-projecting portion of said barrel.

3. The combination of claim 1 in which said stop means comprises a cylindrical sleeve supported within the rearward portion of said barrel, the forward end of said sleeve providing said abutment.

4. In a grease gun having an elongated cylindrical barrel externally threaded on the forward end portion thereof, and a lever-operated grease dispensing head providing an internally threaded cup-shaped cap threadedly received on said barrel forward end portion, the combination comprising an annular gasket of resilient, compressible material interposed between the front end of said barrel and said cap and extending inwardly beyond the wall of said barrel for a distance at least as great as the thickness of said barrel wall and completely therearound, a cylindrical grease-containing cartridge disposed within said barrel, the cylindrical wall of said cartridge being formed of a non-metallic material and terminating in forward and rear ends providing surfaces lying in planes substantially at right angles to the axis of said cartridge, said cartridge wall forward end projecting slightly beyond the forward end of said barrel and pressing directly against the inwardly extending portion of said gasket, said gasket having a rearwardly extending projection bearing against the inside of said cartridge wall, stop means disposed within the rearward portion of said barrel, said stop means being non-compressible and fixed in position and providing an annular abutment in direct contact with the said rear end of said cartridge wall, said abutment being provided by an inwardly projecting portion of said barrel, the cooperating threaded portions of said cap and barrel permitting said cap to be tightened on said barrel until said cartridge wall forward end sealingly engages the said inwardly extending portion of said gasket.

5. The grease gun combination of claim 4 wherein the external diameter of said cartridge is substantially smaller than the internal diameter of said barrel and clearance is provided therebetween except adjacent said abutment, and wherein said barrel also provides an indented portion forwardly of said abutment for holding said container in centered relation within said barrel.

6. The grease gun combination of claim 4 wherein the external diameter of said cartridge is substantially smaller than the internal diameter of said barrel and clearance is provided therebetween except adjacent said abutment, and in which said gasket also provides means for cooperating with the forward end of said cartridge to assist in holding said cartridge in said centered relation.

References Cited in the file of this patent
UNITED STATES PATENTS

| | | |
|---|---|---|
| 2,090,018 | Armstrong | Aug. 17, 1937 |
| 2,123,712 | Clark | July 12, 1938 |
| 2,752,074 | Martin | June 26, 1956 |
| 2,754,033 | Etter | July 10, 1956 |
| 2,915,226 | Sundholm | Dec. 1, 1959 |